(12) United States Patent
Ligman et al.

(10) Patent No.: US 12,378,082 B2
(45) Date of Patent: Aug. 5, 2025

(54) PORTABLE TELESCOPIC CONVEYOR BELT

(71) Applicant: Ligchine International Corporation, Floyds Knobs, IN (US)

(72) Inventors: Peter A. Ligman, Darien, WI (US); Bradley Alan Davis, Janesville, WI (US); Carey A. Zielinski, Janesville, WI (US)

(73) Assignee: Ligchine International Corporation, Floyds Knobs, IN (US)

( * ) Notice: Subject to any disclaimer, the term of this patent is extended or adjusted under 35 U.S.C. 154(b) by 191 days.

(21) Appl. No.: 18/049,536

(22) Filed: Oct. 25, 2022

(65) Prior Publication Data

US 2023/0126101 A1    Apr. 27, 2023

Related U.S. Application Data

(60) Provisional application No. 63/271,600, filed on Oct. 25, 2021.

(51) Int. Cl.
*B65G 41/00* (2006.01)
*B65G 21/14* (2006.01)

(52) U.S. Cl.
CPC .......... *B65G 41/002* (2013.01); *B65G 21/14* (2013.01); *B65G 41/005* (2013.01); *B65G 41/008* (2013.01)

(58) Field of Classification Search
CPC .. B65G 41/008; B65G 41/005; B65G 41/002; B65G 21/14
USPC .......................................................... 198/312
See application file for complete search history.

(56) References Cited

U.S. PATENT DOCUMENTS

| | | | |
|---|---|---|---|
| 1,284,385 | A | 11/1918 | Linden |
| 1,731,231 | A | 10/1929 | Chenoweth |
| 2,116,816 | A | 5/1938 | Kaspar |
| 2,403,812 | A | 7/1946 | Maccallum |
| 2,636,290 | A | 4/1953 | Bell |
| 3,341,029 | A | 9/1967 | Barkley |
| 3,377,933 | A | 4/1968 | Dale |
| 3,675,721 | A | 7/1972 | Davidson |
| 3,721,054 | A | 3/1973 | Hornagold |
| 3,749,504 | A | 7/1973 | Smith |
| 3,840,125 | A | 10/1974 | Cozad |
| 3,870,427 | A | 3/1975 | Allen |
| 3,901,616 | A | 8/1975 | Greening |
| 3,953,052 | A | 4/1976 | Palmcrantz |

(Continued)

FOREIGN PATENT DOCUMENTS

| | | |
|---|---|---|
| AU | 2019359107 | 5/2021 |
| AU | 2019357862 | 6/2021 |

(Continued)

OTHER PUBLICATIONS

European Patent Office; International Search Report and Written Opinion for PCT App. No. PCT/US2022/035287 mailed Oct. 21, 2022.

(Continued)

*Primary Examiner* — James R Bidwell
(74) *Attorney, Agent, or Firm* — Dinsmore & Shohl LLP

(57) ABSTRACT

A portable telescopic conveyor apparatus includes a mounting frame for securing the conveyor to a mobile platform, a boom frame housing a plurality of extendable conveyor sections, and a pair of opposed outriggers for stabilizing the conveyor apparatus when in use.

20 Claims, 12 Drawing Sheets

(56) References Cited

U.S. PATENT DOCUMENTS

| | | |
|---|---|---|
| 3,966,345 A | 6/1976 | Kofel |
| 3,969,035 A | 7/1976 | Silbernagel |
| 3,970,405 A | 7/1976 | Swisher, Jr. |
| 4,029,165 A | 6/1977 | Miller |
| 4,036,372 A | 7/1977 | Rao |
| 4,084,777 A | 4/1978 | Lambert |
| 4,192,626 A | 3/1980 | Silver |
| 4,231,678 A | 11/1980 | Carternock |
| 4,363,409 A | 12/1982 | Laurich-Trost |
| 4,406,375 A | 9/1983 | Hockensmith |
| 4,422,795 A | 12/1983 | Berrange |
| 4,566,823 A | 1/1986 | May |
| 4,655,633 A | 4/1987 | Somero |
| 4,700,786 A | 10/1987 | Berry |
| 4,770,304 A | 9/1988 | Woods |
| 4,789,266 A | 12/1988 | Clarke, Jr. |
| 4,869,618 A | 9/1989 | Morrison |
| 4,896,995 A | 1/1990 | Simmons |
| 4,930,935 A | 6/1990 | Quenzi |
| 4,936,763 A | 6/1990 | Thomas |
| 4,978,246 A | 12/1990 | Quenzi |
| 4,988,233 A | 1/1991 | Kasler |
| 5,009,546 A | 4/1991 | Domenighetti |
| 5,018,555 A | 5/1991 | Hawerkamp |
| 5,039,249 A | 8/1991 | Hansen |
| 5,045,025 A | 9/1991 | Underwood |
| 5,051,025 A | 9/1991 | Taylor, Jr. |
| 5,120,186 A | 6/1992 | Jorgenson |
| 5,129,803 A | 7/1992 | Nomura |
| 5,192,102 A | 3/1993 | Mertens |
| 5,217,320 A | 6/1993 | Cioffi |
| 5,224,793 A | 7/1993 | De Pol |
| 5,234,128 A | 8/1993 | Hill |
| 5,234,281 A | 8/1993 | Somero |
| 5,244,305 A | 9/1993 | Lindley |
| 5,348,418 A | 9/1994 | Campbell |
| 5,360,097 A | 11/1994 | Hibbs |
| 5,375,942 A | 12/1994 | Lindley |
| 5,515,654 A | 5/1996 | Anderson |
| 5,533,831 A | 7/1996 | Allen |
| 5,556,226 A | 9/1996 | Hohmann, Jr. |
| 5,567,075 A | 10/1996 | Allen |
| 6,129,481 A | 10/2000 | Tapio |
| 6,155,708 A | 12/2000 | Lindley |
| 6,203,244 B1 | 3/2001 | Van Ornum |
| 6,227,761 B1 | 5/2001 | Kieranen |
| 6,325,531 B1 | 12/2001 | Lindley |
| 6,328,115 B1 | 12/2001 | Carter, Jr. |
| 6,447,204 B1 | 9/2002 | McDonald |
| 6,481,924 B1 | 11/2002 | Smolders |
| 6,485,227 B1 | 11/2002 | Mathiowetz |
| 6,508,606 B1 | 1/2003 | James, III |
| 6,530,721 B2 | 3/2003 | Yost |
| 6,654,532 B2 | 11/2003 | Tomaru |
| 6,662,939 B1 | 12/2003 | McCusker |
| 6,695,532 B2 | 2/2004 | Somero |
| 6,729,796 B1 | 5/2004 | Green |
| 6,814,532 B1 | 11/2004 | Thompson |
| 6,843,615 B1 | 1/2005 | Cook |
| 6,857,816 B2 | 2/2005 | Saito |
| 6,860,676 B2 | 3/2005 | Pont Feixes |
| 6,976,454 B2 | 12/2005 | Cattaruzzi |
| 7,004,675 B2 | 2/2006 | Wayne |
| 7,044,681 B2 | 5/2006 | Quenzi |
| 7,121,762 B2 | 10/2006 | Quenzi |
| 7,144,191 B2 | 12/2006 | Kieranen |
| 7,172,363 B2 | 2/2007 | Olson |
| 7,175,363 B2 | 2/2007 | Quenzi |
| 7,195,423 B2 | 3/2007 | Halonen |
| 7,195,424 B2 | 3/2007 | Lindley |
| 7,223,059 B2 | 5/2007 | Smith |
| 7,232,277 B2 | 6/2007 | Corbitt |
| 7,296,676 B2 | 11/2007 | Smith |
| 7,311,466 B2 | 12/2007 | Torvinen |
| 7,320,558 B2 | 1/2008 | Quenzi |
| 7,328,810 B1 | 2/2008 | Rhodes |
| 7,396,186 B2 | 7/2008 | Quenzi |
| 7,399,139 B2 | 7/2008 | Kieranen |
| 7,407,339 B2 | 8/2008 | Halonen |
| 7,497,140 B2 | 3/2009 | Blackwelder |
| 7,500,814 B2 | 3/2009 | Meyer |
| 7,540,685 B2 | 6/2009 | Avikainen |
| 7,540,686 B2 | 6/2009 | Heims |
| 7,540,687 B2 | 6/2009 | Neumann |
| 7,559,719 B2 | 7/2009 | Nasby |
| 7,621,694 B1 | 11/2009 | Goodman |
| 7,685,929 B2 | 3/2010 | Mainville |
| 7,748,789 B2 | 7/2010 | Freeburn |
| 7,775,742 B2 | 8/2010 | Buijsman |
| 7,850,396 B2 | 12/2010 | Pietila |
| 7,854,565 B2 | 12/2010 | Halonen |
| 7,874,571 B2 | 1/2011 | Frey |
| 7,891,479 B2 | 2/2011 | Evangelista |
| 7,909,533 B2 | 3/2011 | Quenzi |
| 8,128,390 B2 | 3/2012 | O'Hara |
| 8,132,659 B2 | 3/2012 | Coers |
| 8,152,409 B1 | 4/2012 | Ligman |
| 8,220,806 B2 | 7/2012 | Neudeck |
| 8,322,947 B2 | 12/2012 | Neumann |
| 8,403,594 B2 | 3/2013 | Neumann |
| 8,408,377 B2 | 4/2013 | Werlinger |
| 8,464,859 B2 | 6/2013 | Campbell |
| 8,506,232 B2 | 8/2013 | Gallione |
| 8,591,142 B2 | 11/2013 | Mittleman |
| 8,657,215 B1 | 2/2014 | Blum |
| 8,794,868 B2 | 8/2014 | Fritz |
| 8,919,526 B2 | 12/2014 | Fickeisen |
| 8,985,301 B2 | 3/2015 | Werlinger |
| 9,180,909 B1 | 11/2015 | Coats |
| 9,199,828 B2 | 12/2015 | Steinich |
| 9,290,337 B2 | 3/2016 | Sheehan |
| 9,297,171 B1 | 3/2016 | Ligman |
| 9,316,343 B2 | 4/2016 | O'Hara |
| 9,376,260 B2 | 6/2016 | Saarinen |
| 9,404,272 B1 | 8/2016 | Ligman |
| 9,428,869 B2 | 8/2016 | Pedersen |
| 9,463,933 B2 | 10/2016 | Diebold |
| 9,493,914 B2 | 11/2016 | Kaiser |
| 9,637,318 B2 | 5/2017 | Messina |
| 9,701,481 B2 | 7/2017 | Wilcox |
| 9,708,779 B2 | 7/2017 | Brown |
| 9,708,780 B1 | 7/2017 | Ligman |
| 9,783,093 B1 | 10/2017 | Esch |
| 9,809,937 B2 | 11/2017 | Berning |
| 9,828,184 B1 | 11/2017 | Bynum |
| 9,873,993 B2 | 1/2018 | Berning |
| 9,909,267 B1 | 3/2018 | Ligman |
| 9,969,558 B1 | 5/2018 | Bynum |
| RE46,971 E | 7/2018 | Neumann |
| 10,017,097 B2 | 7/2018 | Ozinga |
| 10,035,446 B2 | 7/2018 | Szentimrey |
| 10,112,775 B2 | 10/2018 | Hanel |
| 10,150,660 B2 | 12/2018 | Koppelaar |
| 10,190,270 B2 | 1/2019 | Hirman |
| 10,233,658 B1 | 3/2019 | Ligman |
| 10,337,153 B2 | 7/2019 | Hoffmann |
| 10,370,801 B2 | 8/2019 | Pinson |
| 10,464,758 B2 | 11/2019 | Wilcox |
| 10,494,776 B2 | 12/2019 | Pietila |
| 10,526,754 B2 | 1/2020 | Fox |
| 10,688,902 B2 | 6/2020 | Rexius |
| 10,710,093 B2 | 7/2020 | McDevitt |
| 10,717,601 B2 | 7/2020 | Kornelsen |
| 10,760,226 B2 | 9/2020 | Guntert |
| 10,766,710 B2 | 9/2020 | Bacon-Maldonado |
| 10,794,016 B2 | 10/2020 | Mckinnon |
| 10,913,381 B2 | 2/2021 | Bacon-Maldonado |
| 10,914,051 B2 | 2/2021 | Keigley |
| 11,162,232 B2 | 11/2021 | Ligman |
| 11,187,001 B1* | 11/2021 | Bynum ............ B65G 47/44 |
| 11,753,253 B1* | 9/2023 | Bynum ............ B65G 21/14 |
| | | 198/313 |
| 12,270,159 B2 | 4/2025 | Ligman |
| 2002/0015618 A1 | 2/2002 | Quenzi |

(56) References Cited

U.S. PATENT DOCUMENTS

| | | |
|---|---|---|
| 2002/0125100 A1* | 9/2002 | Dennis ................ B65G 41/008 198/312 |
| 2002/0127058 A1 | 9/2002 | Zachman |
| 2003/0161684 A1 | 8/2003 | Quenzi |
| 2004/0009038 A1 | 1/2004 | Roth |
| 2004/0076472 A1 | 4/2004 | Holmes |
| 2005/0141963 A1 | 6/2005 | Holmes |
| 2005/0207843 A1 | 9/2005 | Jackson |
| 2005/0263302 A1 | 12/2005 | Newnam |
| 2006/0018715 A1 | 1/2006 | Halonen |
| 2006/0120801 A1 | 6/2006 | Johnson |
| 2006/0216114 A1 | 9/2006 | Quenzi |
| 2007/0031191 A1 | 2/2007 | Quenzie |
| 2007/0116520 A1 | 5/2007 | Quenzi |
| 2007/0127985 A1 | 6/2007 | Quenzie |
| 2007/0140792 A1 | 7/2007 | Lindley |
| 2007/0154260 A1 | 7/2007 | Lindley |
| 2008/0135375 A1 | 6/2008 | Pettijohn |
| 2008/0253221 A1 | 10/2008 | Lindley |
| 2010/0008750 A1 | 1/2010 | Jones |
| 2010/0183369 A1 | 7/2010 | Lindley |
| 2010/0215433 A1 | 8/2010 | Fritz |
| 2010/0266339 A1 | 10/2010 | Guntert, Jr. |
| 2010/0296868 A1 | 11/2010 | Braun |
| 2011/0002736 A1 | 1/2011 | Monger |
| 2011/0126700 A1* | 6/2011 | Johannsen ............ B65G 21/14 92/146 |
| 2011/0236129 A1 | 9/2011 | Guntert, Jr. |
| 2011/0266774 A1 | 11/2011 | Gregg |
| 2012/0183350 A1 | 7/2012 | Mittleman |
| 2013/0294834 A1 | 11/2013 | Pai |
| 2013/0333253 A1 | 12/2013 | Philippe |
| 2014/0169881 A1 | 6/2014 | Hagen |
| 2014/0331632 A1 | 11/2014 | Schots |
| 2014/0363232 A1 | 12/2014 | Pietila |
| 2015/0093193 A1 | 4/2015 | Zimmermann |
| 2015/0258926 A1 | 9/2015 | Wick |
| 2015/0367388 A1 | 12/2015 | Wang |
| 2016/0009507 A1 | 1/2016 | Wiseman |
| 2016/0177519 A1 | 6/2016 | Fritz |
| 2016/0245917 A1 | 8/2016 | Schoonmaker |
| 2017/0218576 A1 | 8/2017 | Lindley |
| 2017/0218577 A1 | 8/2017 | Lindley |
| 2018/0327982 A1 | 11/2018 | Leukuma |
| 2018/0334332 A1 | 11/2018 | Eberts |
| 2020/0010006 A1 | 1/2020 | Wilson |
| 2020/0109525 A1 | 4/2020 | Ligman |
| 2020/0109526 A1 | 4/2020 | Ligman |
| 2020/0109573 A1 | 4/2020 | Ligman |
| 2020/0248413 A1 | 8/2020 | Wolf |
| 2020/0263367 A1 | 8/2020 | Berning |
| 2020/0290494 A1 | 9/2020 | Key |
| 2020/0346254 A1 | 11/2020 | Opatril |
| 2020/0392675 A1 | 12/2020 | Guntert, Jr. |
| 2020/0399071 A1 | 12/2020 | Wilson |
| 2021/0053766 A1 | 2/2021 | Bacon-Maldonado, III |
| 2021/0131046 A1 | 5/2021 | Hirman |
| 2021/0139246 A1 | 5/2021 | Wilson |
| 2022/0049436 A1 | 2/2022 | Ligman |
| 2022/0162814 A1 | 5/2022 | Ligman |
| 2022/0267967 A1 | 8/2022 | Ligman |

FOREIGN PATENT DOCUMENTS

| | | |
|---|---|---|
| AU | 2019358780 | 6/2021 |
| CA | 2272485 | 11/2000 |
| CN | 113525557 | 10/2021 |
| EP | 1256657 A1 | 11/2002 |
| EP | 1267000 A2 | 12/2002 |
| EP | 3864236 | 8/2021 |
| EP | 3864237 | 8/2021 |
| EP | 3864238 | 8/2021 |
| ES | 2247952 A1 | 3/2006 |
| GB | 2246997 | 2/1992 |
| WO | 2006133490 A1 | 12/2006 |
| WO | 2019133917 A1 | 7/2019 |
| WO | 2020009821 A1 | 1/2020 |
| WO | 2020076468 A1 | 4/2020 |
| WO | 2020076469 A1 | 4/2020 |
| WO | 2020076470 A1 | 4/2020 |
| WO | 2020148632 A1 | 7/2020 |
| WO | 2020150808 A1 | 7/2020 |
| WO | 2022182755 A1 | 9/2022 |
| WO | WO 2023278421 | 1/2023 |
| WO | WO2023076906 A1 | 5/2023 |

OTHER PUBLICATIONS

European Patent Office; International Search Report and Written Opinion for PCT App. No. PCT/US2022/078664 mailed Feb. 10, 2023.
U.S. Appl. No. 18/315,925, filed May 11, 2023 titled Electronically Actuated Leveling System for Screeding Concrete.
U.S. Appl. No. 18/322,962, filed May 24, 2023 titled Swing Boom Concrete Screeding Apparatus.
European Patent Office; International Search Report and Written Opinion issued in PCT/US2024/011682 mailed May 16, 2024.
International Bureau of WIPO; International Preliminary Report on Patentability issued in PCT/US2022/078664 issued Apr. 30, 2024 and mailed May 10, 2024.
U.S. Appl. No. 18/414,213, filed Jan. 16, 2024 titled Concrete Screed with Vision System.
U.S. Appl. No. 18/414,177 filed Jan. 16, 2024 titled Electric Apparatus for Screeding Concrete.
PCT Patent Application No. PCT/US2024/011682 filed Jan. 16, 2024 titled Electric Apparatus for Screeding Concrete.
European Patent Office International Report on Patentability issued in PCT/US2022/035287 mailed Jan. 11, 2024.
European Patent Office: Intention to Grant issued in EP Application No. 19780088.1 mailed Dec. 4, 2023.
European Patent Office: Intention to Grant issued in EP Application No. 19779704.6 mailed Dec. 4, 2023.
European Patent Office: Intention to Grant issued in EP Application No. 19779340.9 mailed Dec. 11, 2023.
European Patent Office; International Search Report and Written Opinion for PCT App. No. PCT/US2019/051694 dated Nov. 7, 2019.
European Patent Office; International Search Report and Written Opinion for PCT App. No. PCT/US2019/051695 dated Nov. 7, 2019.
European Patent Office; International Search Report and Written Opinion for PCT App. No. PCT/US2019/051698 dated Nov. 7, 2019.
European Patent Office; International Search Report and Written Opinion for PCT App. No. PCT/US2022/017515 dated May 12, 2022.

* cited by examiner

PORTABLE TELESCOPIC CONVEYOR BELT

BACKGROUND OF THE INVENTION

Field of the Invention

The present invention relates generally to a portable conveyor system and more specifically to an extendable conveyor configured to be secured to and operated by a conventional skid loader or skid steer machine, thereby providing a lightweight and portable conveyor belt that is useful in a wide variety of applications.

Description of the Related Art

In construction settings when loose material such as stone, aggregate, mulch, gravel, or even fill dirt needs to be distributed to an area for further use often a small, portable conveyor is put in place to accept the material on a first end and convey it to a second end where it is dropped and then further distributed, usually by operation of manual labor. Material distribution as described above is common in large construction projects, for example where a great deal of concrete is being poured for roads or foundations to buildings.

Many prior art portable conveyors are transported to a constructions site via a truck or similar vehicle and then assembled in place. Some come in multiple sections and must be secured together, which necessitates a great deal of labor and mechanical adjustment. Many systems have wheels for maneuvering the conveyor in position between the source of material, often a dump truck or loader, and the area to which the material is being conveyed. Many prior art portable conveyors also have internal combustion engines or electric or hydraulic motors for operating the various conveyor systems. Furthermore, many prior art conveyors include must incorporate their own hydraulic systems that require a hydraulic pump driven by a motor, as well as concomitant valves and controls to operate the conveyor belt and associated moving parts.

Many of these prior art portable conveying systems have a wide variety of features and uses. However, these systems are also typically quite complex, heavy, and costly due to the need for complicated mechanical and electrical controls required to operate and maneuver the conveyor into the various site locations necessary to distribute the material.

Accordingly, there is a need in the art for a conveyor system for distributing material that provides a highly maneuverable and portable conveyor with a minimum of mechanical and electrical complexity, that is also light weight, and is capable of being quickly positioned into place in a wide variety of construction applications.

Other features, objects and advantages of the present invention will become apparent from the detailed description of the drawing Figures taken in conjunction with the appended drawing Figures.

SUMMARY OF THE INVENTION

The present disclosure is related to systems and apparatus for conveying materials, particularly a portable conveyor system that is mounted or secured to a skid loader that has its own hydraulic power system. In some exemplary embodiments the portable conveyor system includes a plurality of hydraulic and/or electric motors to drive a rotating belt routed over a plurality of nesting conveyor sections. A plurality of hydraulic cylinders may also form a part of the system to effect rotation and elevation of a plurality of conveyor sections and at least a pair of outriggers that may be deployed for stabilization of the system.

As used herein for purposes of the present disclosure, the term "conveyor" should be understood to be generally synonymous with and include any device that is capable of accepting material at a first end and conveying it to a second end, typically through operation of a rotating belt or belts. The system and apparatus referred to herein may in some embodiments be operated by internal combustion systems, electrical systems, and hydraulic systems and may include a plurality of electrical, electro-mechanical and hydraulically operated components and sensors. Furthermore, the various components of the conveyor system disclosed herein are operable by and responsive to manipulation of electrical and hydraulic control systems that are operated by control knobs, selectors, joysticks, switches or other operator interfaces that form a part of a skid steer, skid loader, or other mobile platform capable of supplying such power systems, but which do not form a part of the invention.

In some aspects and embodiments a conveyor apparatus includes a mounting frame and concomitant mounting plate that facilitates easy attachment to a mobile platform such as a skid loader or track drive. The mounting frame may include a slew drive oriented generally horizontally, such that slew drive rotates an upper mounting plate around a vertical axis. In some aspects a pair of boom mounts may extend from the upper mounting plate.

Furthermore, in accordance with some embodiments a boom frame is provided that is pivotally mounted to slew drive boom mounts such that slew drive is capable of rotating the boom frame through at least forty-five degrees of rotation bi-directionally. A plurality of telescopic conveyor sections are secured to and at least partially enclosed by the boom frame, whereby rotation of the boom frame effects rotation of the conveyor sections. Conveyor sections may be extended and retracted by a combination of extendable and retractable actuators and cable and pulley systems secured at various points along the boom frame and the conveyor sections. Furthermore, a plurality of guide rollers and wear slides are provided along a plurality of points on the conveyor sections to provide ease of relative motion between the telescopic conveyor sections.

In accordance with various embodiments and aspects the conveyor sections are connected and covered by a conveyor belt that is driven by drive roller that is operatively coupled to a conveyor drive motor. The conveyor drive motor may be electric or hydraulic and is provided with a source of hydraulic or electrical power by the skid loader.

In some aspects of the conveyor system a pair of opposed outriggers extend outwardly from opposite sides of the mounting frame. The outriggers may be capable of lateral and vertical motion to stabilize the conveyor apparatus as it is positioned to transport materials. A variety of different actuators may be used to control the outrigger lateral and vertical positions and may be powered by electrical or hydraulic power from the skid loader or mobile platform.

In some embodiments a plurality of boom elevation actuators are provided that are secured between the mounting frame and a point on the boom frame. The elevation actuators are then extended to elevate the forward end of the boom frame, and thus the conveyor sections between sub-grade and elevated angles, for precise positioning of the conveyor system for distribution of materials.

Additionally, in some aspects a control system integral to and included with a skid steer that supplies hydraulic and/or electrical power to the conveyor system is operatively connected to the conveyor system to provide a quick and easy way for a user or operator to control the conveyor system. Furthermore, a remote control system may be implemented to operate the hydraulic and electrical controls of a skid steer and thus enable an operator to control the conveyor system at a remote location as required for a particular application.

It should be appreciated that all combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWING FIGURES

In the drawings, like reference characters generally refer to the same parts throughout the different views. Also, the drawings are not necessarily to scale, emphasis instead generally being placed upon illustrating the principles of the invention.

DETAILED DESCRIPTION OF THE PREFERRED EMBODIMENT(S)

Figure 1:
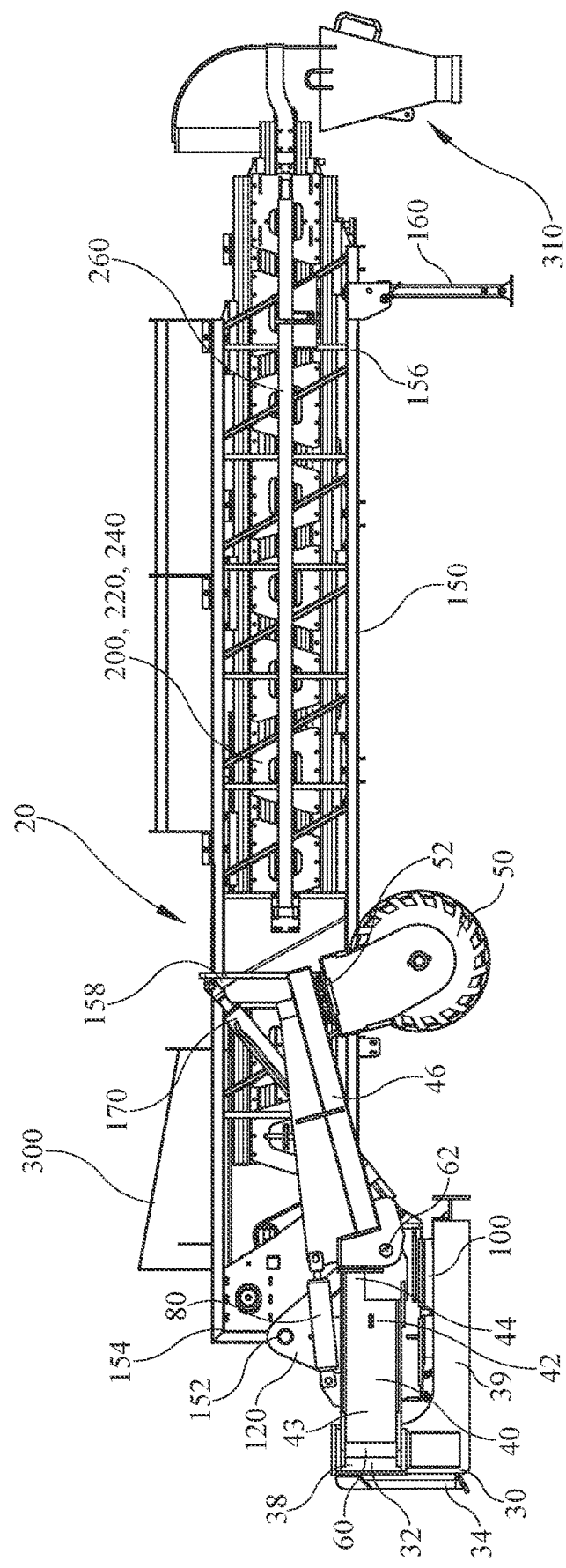
FIG. 1 is a side view of a portable conveyor for use with a skid loader in accordance with some aspects and embodiments.
Figure 2:
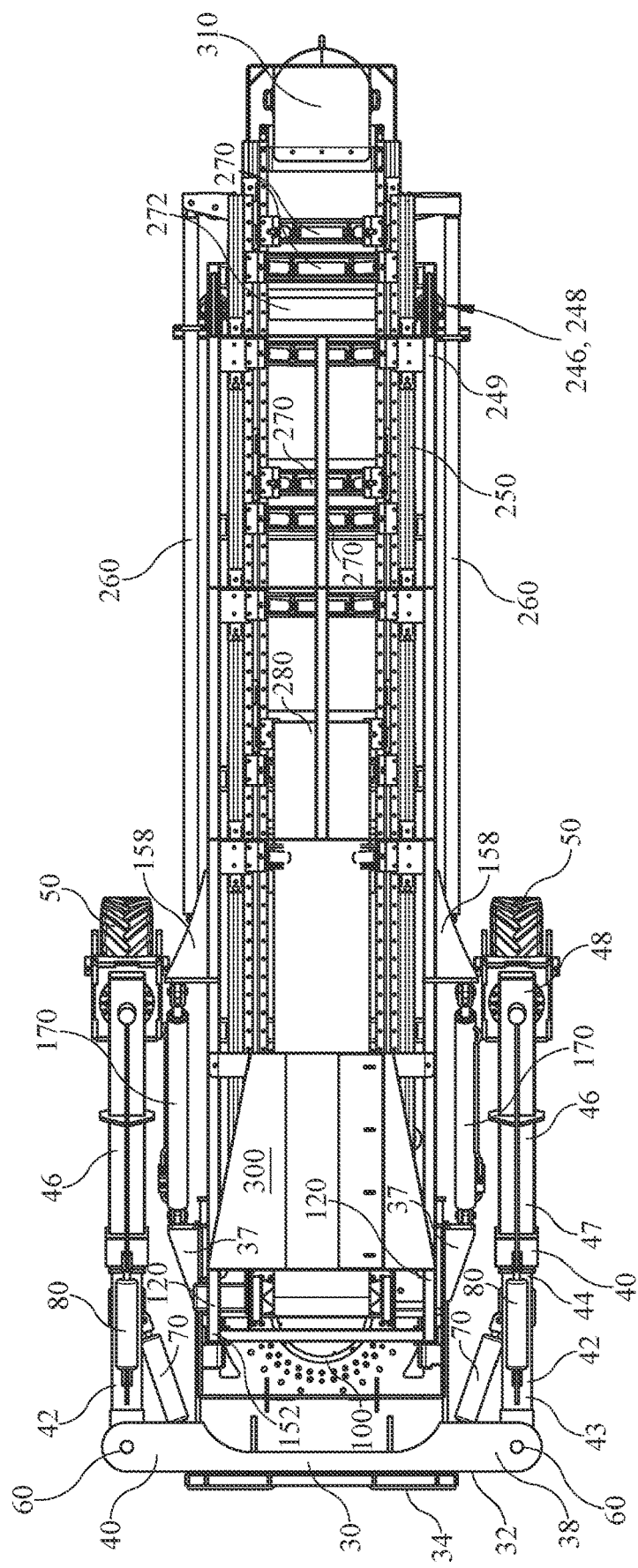
FIG. 2 is a top view of a portable conveyor for use with a skid loader in accordance with some aspects and embodiments.

Numerous variations and modifications will be apparent to one of ordinary skill in the art, as will become apparent from the description below. Therefore, the various embodiments described and claimed herein is not limited to the specific implementations set forth below.

Referring now to drawing FIGS. 1-12, and in accordance with some aspects and embodiments, the system and apparatus 20 described overcomes the aforementioned inherent problems in the prior art by providing a portable conveyor system and apparatus 20 for use with a conventional skid loader 1. As best depicted in FIG., 12 and in exemplary embodiments skid loader 1 may be a conventional, known in the art device, and may in some embodiments include a standard mounting system or accessory mount 2 to which various implements such as a loader bucket or the like are secured for operation. Skid loader 1 typically includes an internal combustion or electric motor for driving a plurality of drive wheels as well as a hydraulic fluid system 3 including a pump (not shown) to pressurize hydraulic fluid and thereby provide a pressurized hydraulic fluid for operating various implements that may be mounted or secured to skid loader 1. Skid loader 1 hydraulic assembly may comprise a conventional hydraulic pump, manifold, and associated control valves for supplying pressurized fluid to various components of skid loader 1 and any implements secured thereto. Furthermore, a plurality of hydraulic system supply and return connections 4 and accessory electrical power connections 6 may be positioned on skid loader 1 proximate accessory mount 2 to enable quick and easy hydraulic and electrical connection to any implement or device secured to accessory mount 2.

Additionally, in exemplary embodiments of many skid loader 1 devices include a control system (not depicted) that permits an operator to control the hydraulic supply system 3 and accessory electrical power system 6 of the skid loader 1 to operate an implement requiring hydraulic power from a cab or cockpit 8 of skid loader 1 utilizing hand-operated controls such as switches, joysticks, toggles, or the equivalent. Furthermore, in some embodiments skid loaders 1 may be equipped with remote control capabilities, whereby an operator may utilize a handheld graphical user interface or GUI, such as a cellular phone or tablet with a concomitant application, to control the various features and operating functions of skid loader 1 from a remote location. In some exemplary embodiments, operation of hydraulic supply system 3 and accessory electrical power 6 can be operated either through hand controls on skid loader 1 or via a remote control interface or GUI, without departing from the scope of the disclosed embodiments. It should be noted that the instant application utilized the term "skid loader 1" in the context of a mobile operating platform to be used in conjunction with the embodiments described herein, however a wide variety of equivalent devices may be employed in place of skid loader 1, including skid-steers, tractors, loaders, track drives, track loaders, and all equivalents thereof.

Referring now to the various embodiments shown in FIGS. 1-4, for example, portable conveyor system 20 may include a mounting frame, 30, that includes at a rear portion 32 thereof a mounting plate 34 that may engage and be secured to a conventional mounting system of accessory mount 2 of skid loader 1. It should be noted that skid loader 1 can be configured with a standard accessory mounting system 2, or a specifically configured mounting assembly 2 for securing an implement such as conveyor system 20 without departing from the scope of the present invention. In exemplary embodiments conveyor 20 includes a mounting frame 30 that is secured to skid loader 1 mounting plate 2 along rear portion or edge thereof 32 by operation of mounting plate 34 engaging skid loader 1 accessory mount 2 so that mount 2 provides support for conveyor system 20 such that skid loader 1 is capable of elevating and moving conveyor system 20. In this fashion skid loader 1 may maneuver and place conveyor system 20 into exact locations in a construction site to enable efficient offloading and distribution of materials. In some aspects and embodiments mounting frame 30 can be constructed of a plurality of rigid, weather-resistant materials.

Referring now to FIGS. 1-3, 7 and 8, mounting frame 30 in some embodiments includes a pair of outrigger mounts 38 that extend from mounting frame 30 on opposed sides thereof. In some aspects and embodiments outrigger mount 38 may comprise a rigid mounting member 38 extending outwardly from frame 30 to which an outrigger 40 is secured. A pair of opposed outriggers 40 are secured to outrigger mounts 38 such that outriggers 40 are capable of being extended horizontally and vertically to provide lateral and elevational motion to conveyor system 20.

In some embodiments, each outrigger 40 includes a lateral arm 42 that is secured at a first end 43 to outrigger mount 38 via a hinge 60 so that lateral arm 42 is capable of lateral movement with respect to mounting frame 30. A second end 44 of lateral arm 42 is secured to an outrigger elevation arm 46 at a first end 47 thereof via a hinge 62 such that elevation arm 44 is capable of upward and downward motion with respect to mounting frame 30. In some embodiments a wheel 50 may be pivotally secured to a second end 48 of elevation arm 44 to enable some motion of outriggers 40 as their lateral and elevational positions are adjusted during operation and wheels 50 are in contact with the ground.

Each outrigger lateral arm 42 is equipped with a dedicated lateral actuator 70 that is secured between mounting frame 30 or outrigger mount 38 and second end 44 of lateral arm 42. Operation of lateral actuator 70 between an extended and retracted position has the effect of laterally extending outrigger 40 for operation and stability of conveyor system 20, and pulling outrigger 40 inwardly near mounting frame 30 as needed for transport or when stability isn't necessary. It should be noted that while reference may often be made to hydraulic actuators, lateral actuator 70, as well as all other actuators disclosed and described herein, can be in some embodiments hydraulic actuators such as hydraulic cylinders, electrically powered actuators, such as linear actuators or motor driven gear drives, or any other actuator capable of being powered and operated using skid steer 1 control systems.

Each outrigger elevation arm 46 is equipped with a dedicated elevation actuator 80 that is secured between first end 43 of lateral arm 42 and first end 47 of elevation arm 46. Operation of elevation actuator 80 between an extended and retracted position has the effect of forcing elevation arm 44 of outrigger 40 upwardly or downwardly, thereby elevating or lowering outriggers 40 to provide for positive contact with the surface on which conveyor system 20 is positioned. The outriggers 40 and their concomitant operational characteristics provide for ease of transport and handling of conveyor system 20 while offering superior stability and maneuverability during operation.

Figure 11:
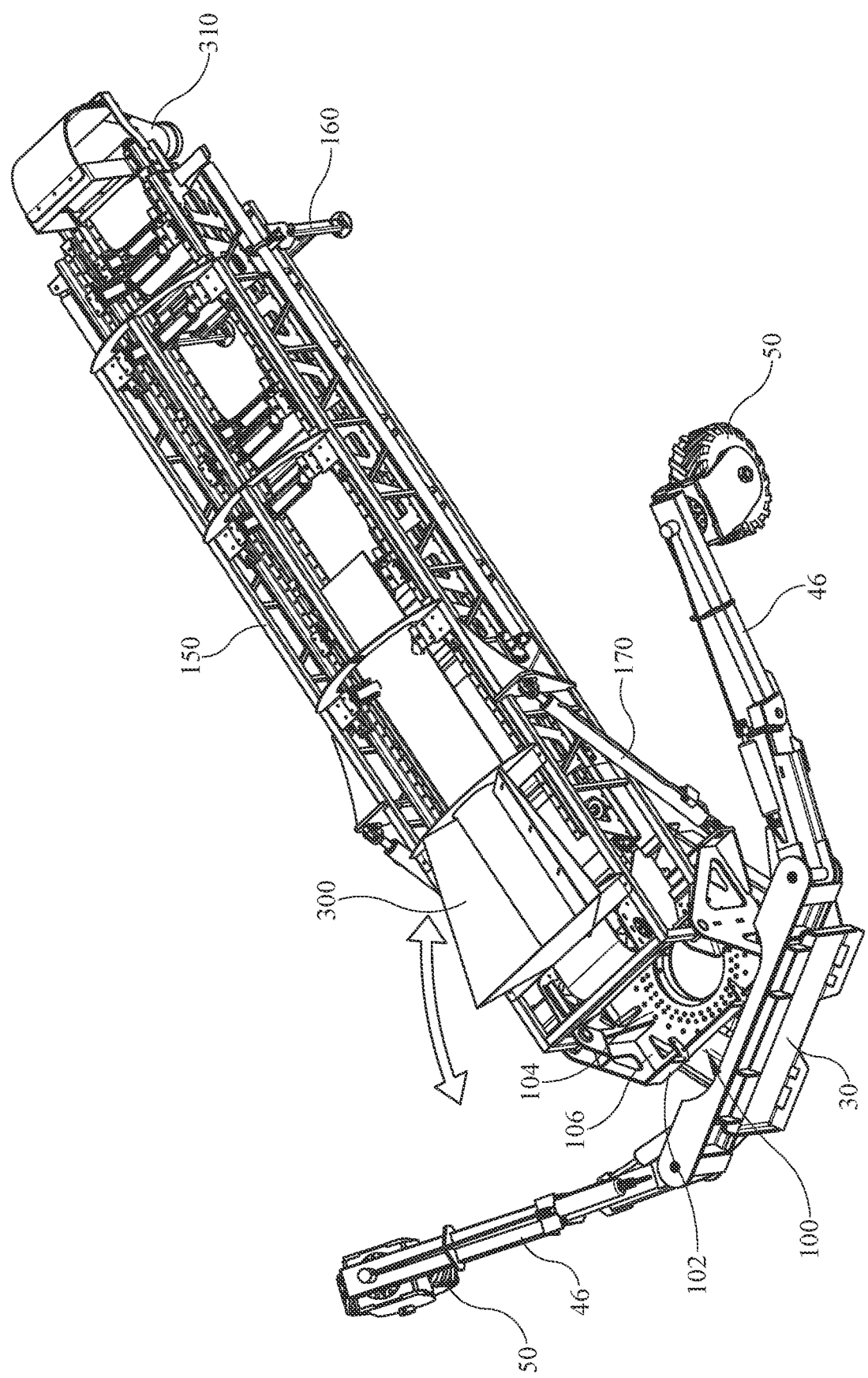
FIG. 11 is a perspective view of a portable conveyor for use with a skid loader in accordance with some aspects and embodiments.
Figure 12:
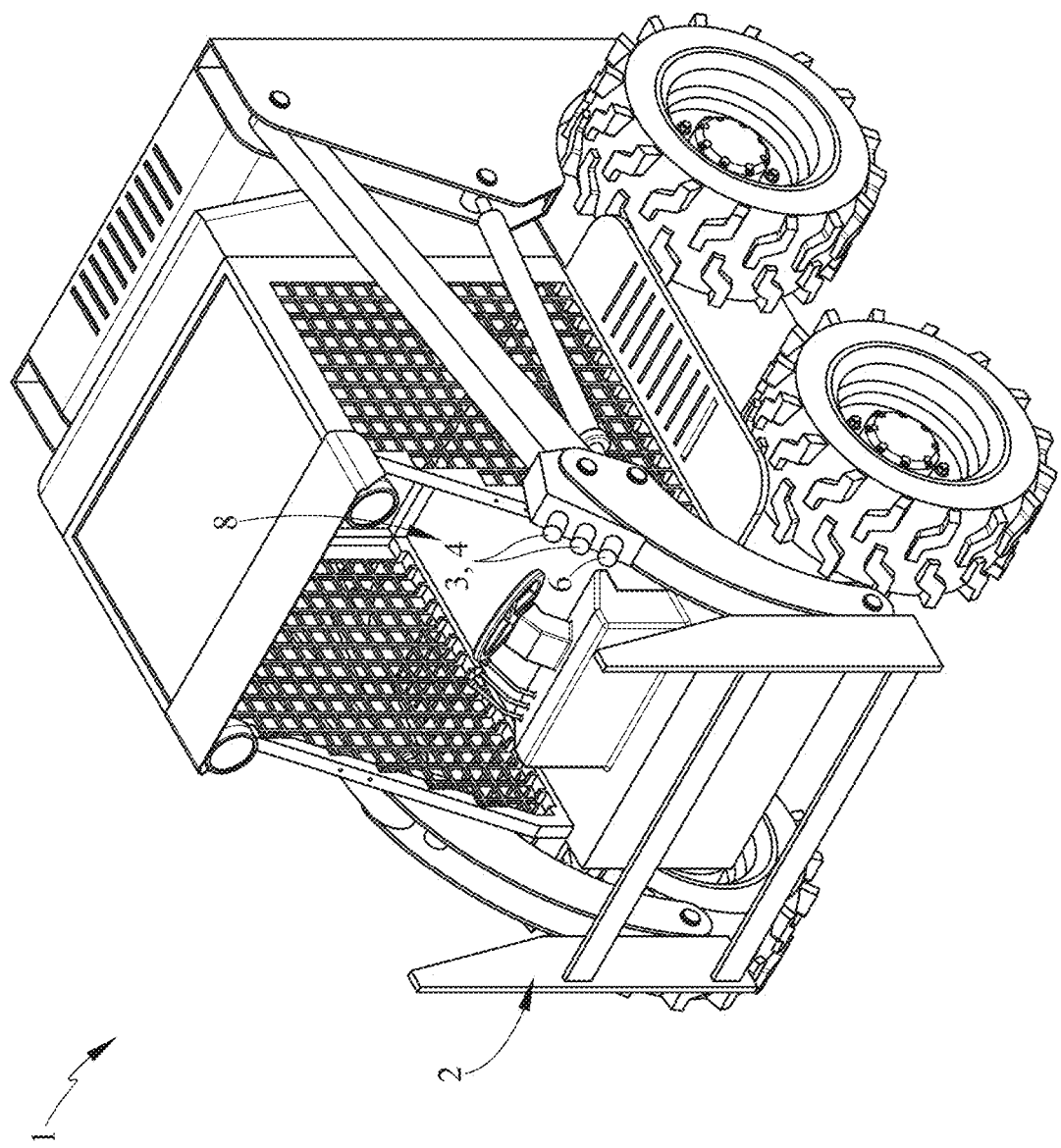
FIG. 12 is a perspective view of a skid loader in accordance with some aspects and embodiments.

Referring again to FIGS. 1-4, 8 and 11, and in accordance with some embodiments of system 20 mounting frame 30 includes a slew drive 100 integrally secured to a bottom portion 39 of mounting frame 30 in a generally horizontal orientation. Slew drive 100 includes a housing 102 securely mounted to mounting frame 30, and a rotatable slew ring 104 and upper plate 106 that are capable of rotation with respect to housing 102 and frame 30 around a generally vertical axis. Upper plate 106 is secured to and driven by the rotation of slew ring 104 and functions as a mounting surface and support for a conveyor frame 140 as detailed herein below. Slew drive 100 may be driven (rotated) by conventional slew drive systems, such as a slew drive hydraulic or electric motor driving a gear that in turn engages gear teeth disposed on a circumferential portion of slew ring 104. Alternatively, slew drive may be rotated by a hydraulic cylinder rotating a flange or lever secured to slew ring 104. Other equivalent known slew drive rotational mechanisms may be used in conjunction with conveyor system 20 and slew drive 100 without departing from the various aspects of the conveyor system 20 described herein. In some embodiments, and as best depicted in FIG. 11 slew ring 104 and upper plate 106 are capable of at least 45 degrees of rotation, thereby enable rotation of conveyor system 20 to a plurality of positions and orientations.

In accordance with further aspects and embodiments as best depicted in FIGS. 1-8 a pair of boom mounts 120 are secured to and extend from slew drive 100 upper plate 106 such that a boom frame 150 may be pivotally secured thereto at a rear end 154 thereof, through connection with a pair of opposed hinges 152. Furthermore, a pair of conveyor elevation actuators 170 are provided, the actuators 170 being secured between an upper point 158 on boom frame 150 and a lower point or flange 37 on mounting frame 30.

Figure 10:
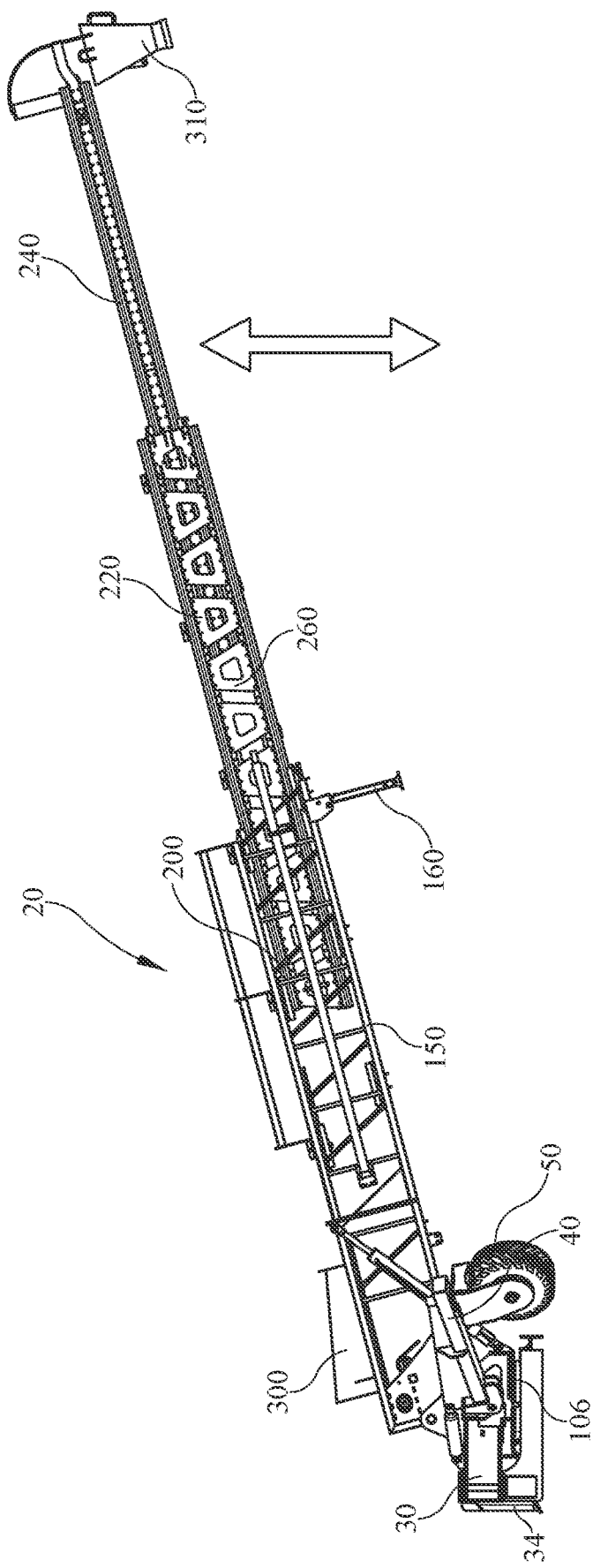
FIG. 10 is a perspective view of a portable conveyor for use with a skid loader in accordance with some aspects and embodiments.

It should be noted that in various embodiments where hydraulic actuators 170 are utilized, one of ordinary skill will understand that a variety of actuators, for example electrical actuators of various construction, linear actuators or the equivalent may be employed to extend and retract the various components of system 20 without departing from the scope of the embodiments described and claimed. When extended, conveyor elevation actuators 170 operate to elevate boom frame 150 vertically around an axis defined by hinges 152, thereby enabling an elevated orientation for a front end 156 of boom frame. FIG. 10 provides an exemplary depiction of boom frame 150, and thus conveyor system 20, in an elevated position. Boom frame 150 may further include a pair of support legs 160 secured to and extending downwardly from front end 156 of boom frame, thereby providing support for boom frame 150 when support legs 160 are resting on the ground. This feature of system 20 provides stability and support to conveyor system 20 during transport, or where a level boom frame 150 orientation is desirable.

Boom frame 150 provides support and protection for a plurality of conveyor sections, 200, 220, and 240 respectively. While three conveyor sections 200, 220 and 240 are depicted in the drawing Figures, it will be understood that more or fewer conveyor sections 200 may be employed in the context of the conveyor system 20 described herein without departing from the scope thereof. In the various aspects depicted herein a first conveyor section 200 is disposed completely inside boom frame 150 while telescoping second conveyor section 220 and third conveyor section 240 are capable of being extended outwardly beyond front end 156 of boom frame 156, thereby providing a telescopic and extendable conveyor system 20.

Figure 3:
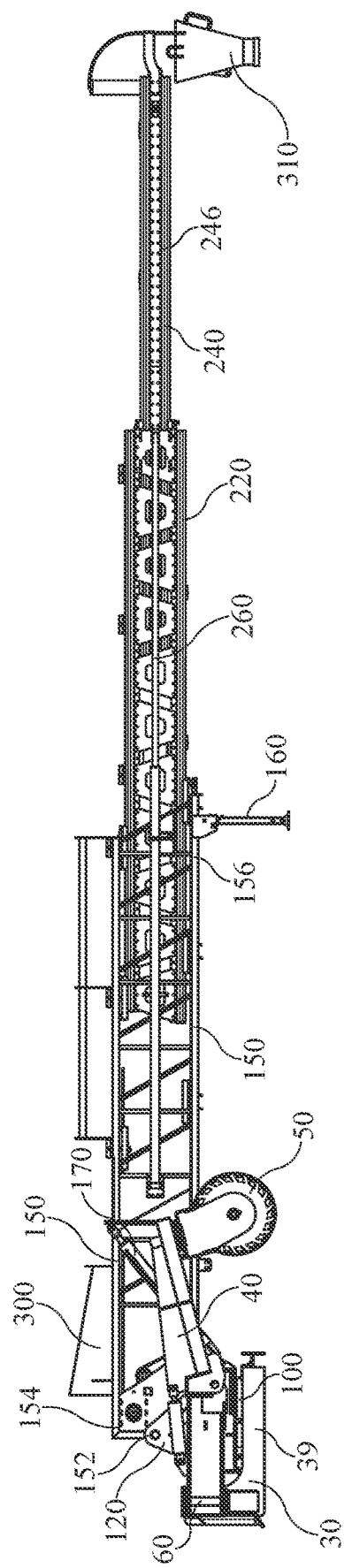
FIG. 3 is a side view of a portable conveyor for use with a skid loader in accordance with some aspects and embodiments.

In accordance with some embodiments a pair of telescopic boom actuators 260 are secured between a point 158 of boom frame 150 and a front end 222 of second conveyor section 220, on either side thereof that are capable of extension and retraction via hydraulic operation. As before, skid loader 1 hydraulic system 3 or electrical system 6 may be utilized to control telescopic boom actuators 260, thereby extending second conveyor section 220 outwardly from first conveyor section 200. Additionally, third conveyor section 240 is equipped with a set of telescopic boom cables 246 and concomitant pulleys 248 that are secured at a first end 249 to second conveyor section 220 and a second end 250 to third conveyor section 240. As telescopic boom actuators 260 are actuated to extend second conveyor section 220, telescopic boom cables 246 are placed under tension to simultaneously extend third boom section 240 outwardly. Accordingly, second and third boom sections 220, 240 are extended (and retracted) simultaneously as needed by operation of telescopic boom actuators 260. In this fashion conveyor 20 can be operated in any position between fully extended, as depicted in FIG. 3, to fully retracted, as depicted in FIG. 1, simply by operating telescopic boom actuators 260.

Figure 4:
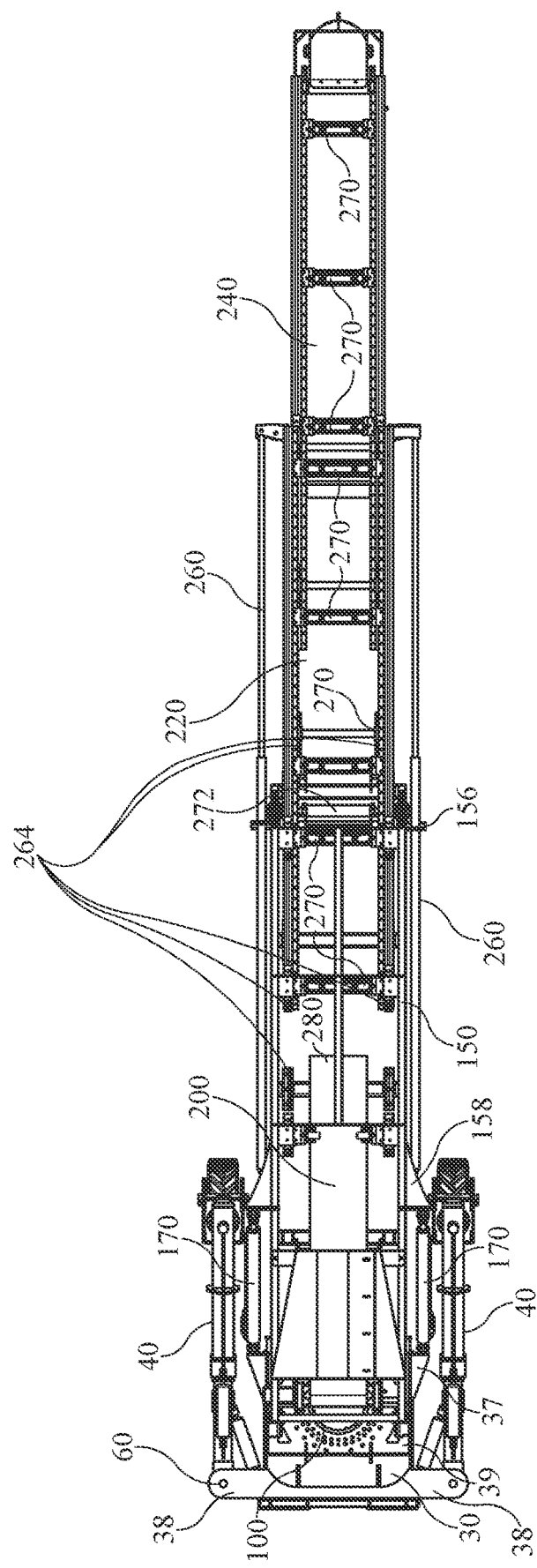
FIG. 4 is a top view of a portable conveyor for use with a skid loader in accordance with some aspects and embodiments.

As best seen in FIG. 4, when extending and retracting, conveyor second and third sections 220, 240, are advantageously guided and supported by a plurality of wear slides 264 positioned at a plurality of points along a bottom portion of boom frame 150, first conveyor section 200, second conveyor section 220 and third conveyor section 240. Wear slides 264 can be comprised of a variety of hard, low friction materials, for example polytetrafluorethylene or the like, to enable and facilitate the relative motion of conveyor sections 200, 220, and 240 as conveyor system 20 is extended and retracted as required. Wear slides 264 can also be removed and replaced as wear occurs during normal operation of system 20 with minimal disruption to system 20 operation.

Figure 5:
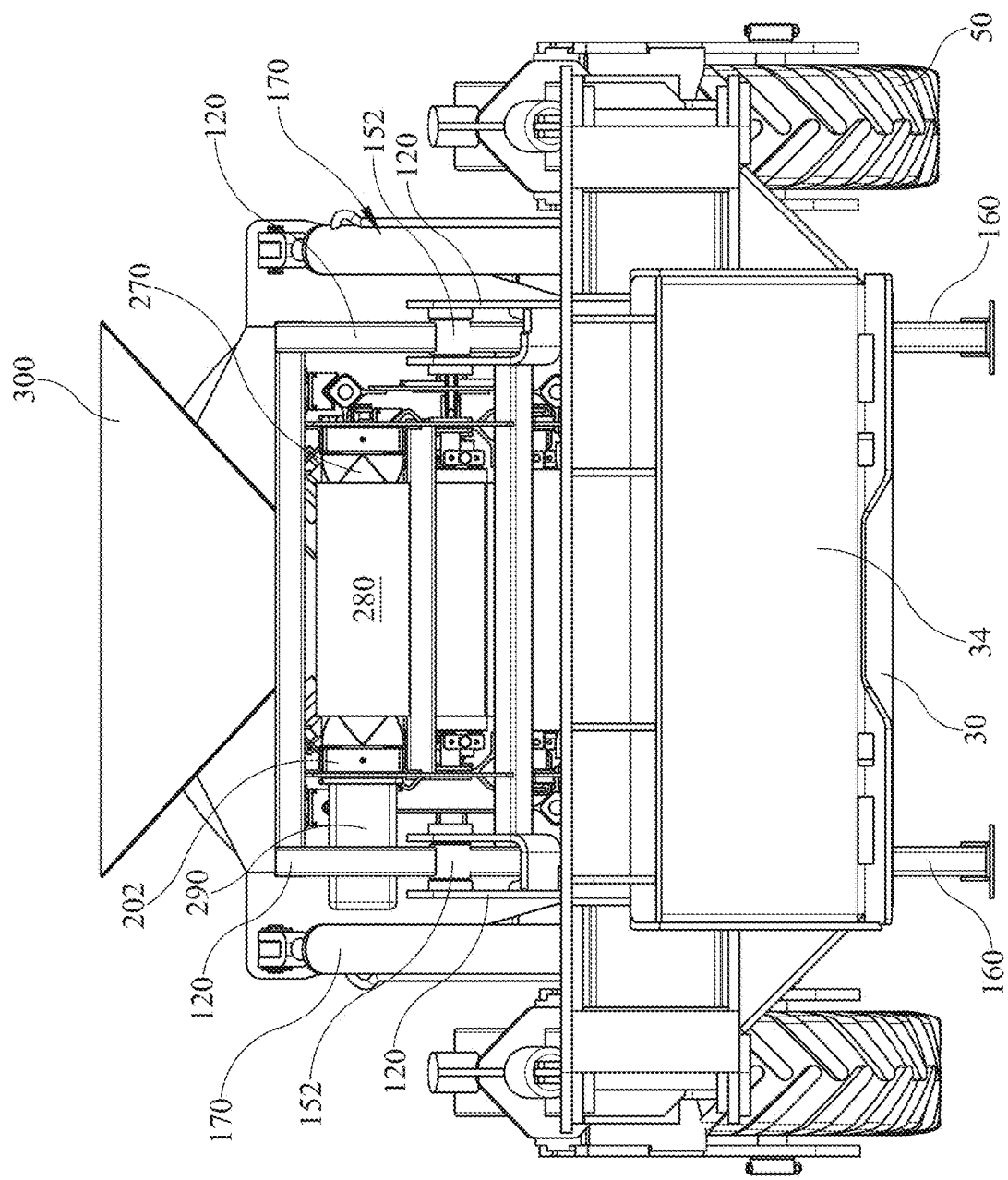
FIG. 5 is a rear view of a portable conveyor for use with a skid loader in accordance with some aspects and embodiments.
Figure 6:
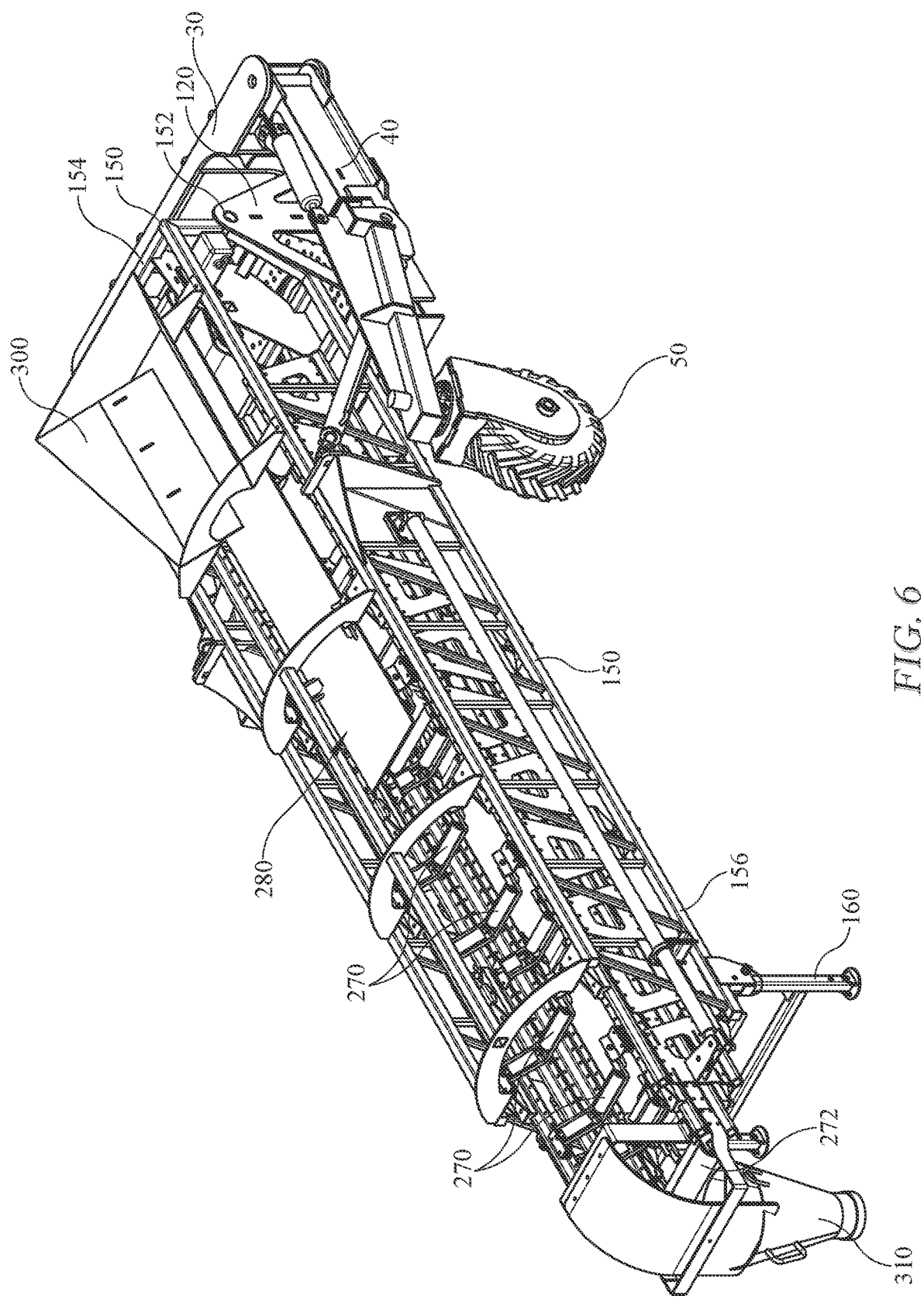
FIG. 6 is a perspective view of a portable conveyor for use with a skid loader in accordance with some aspects and embodiments.
Figure 7:
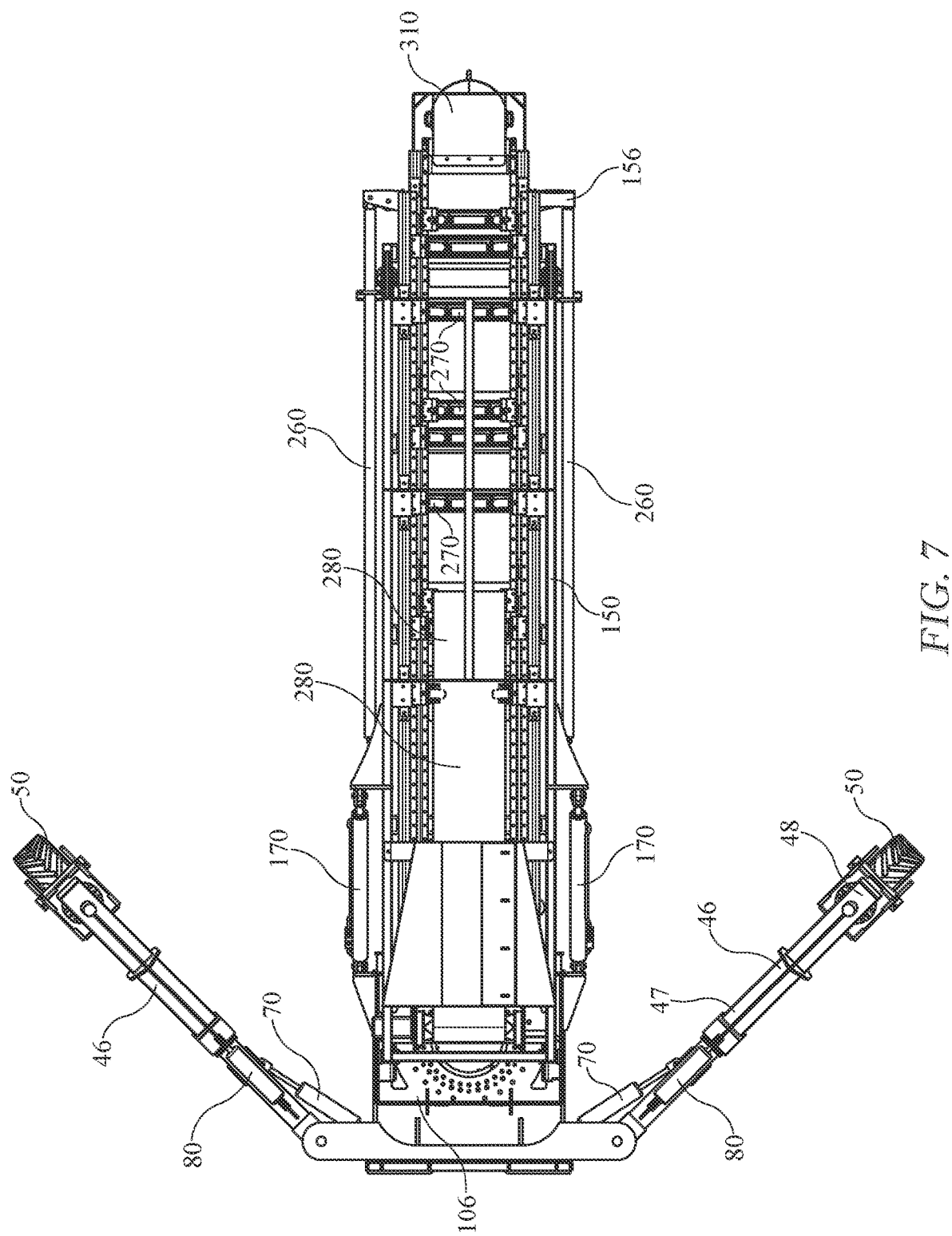
FIG. 7 is a top view of a portable conveyor for use with a skid loader in accordance with some aspects and embodiments.
Figure 8:
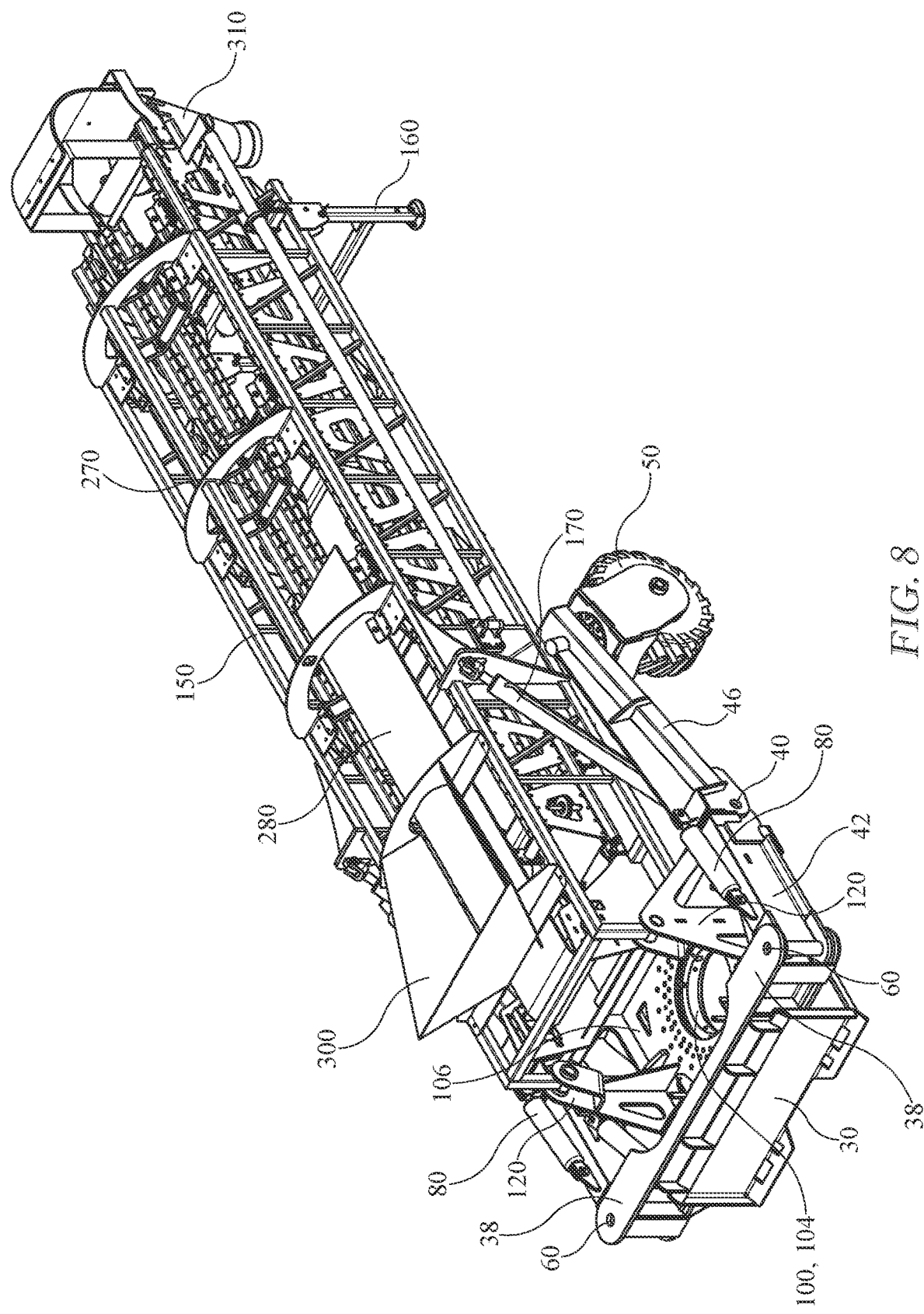
FIG. 8 is a perspective view of a portable conveyor for use with a skid loader in accordance with some aspects and embodiments.
Figure 9:
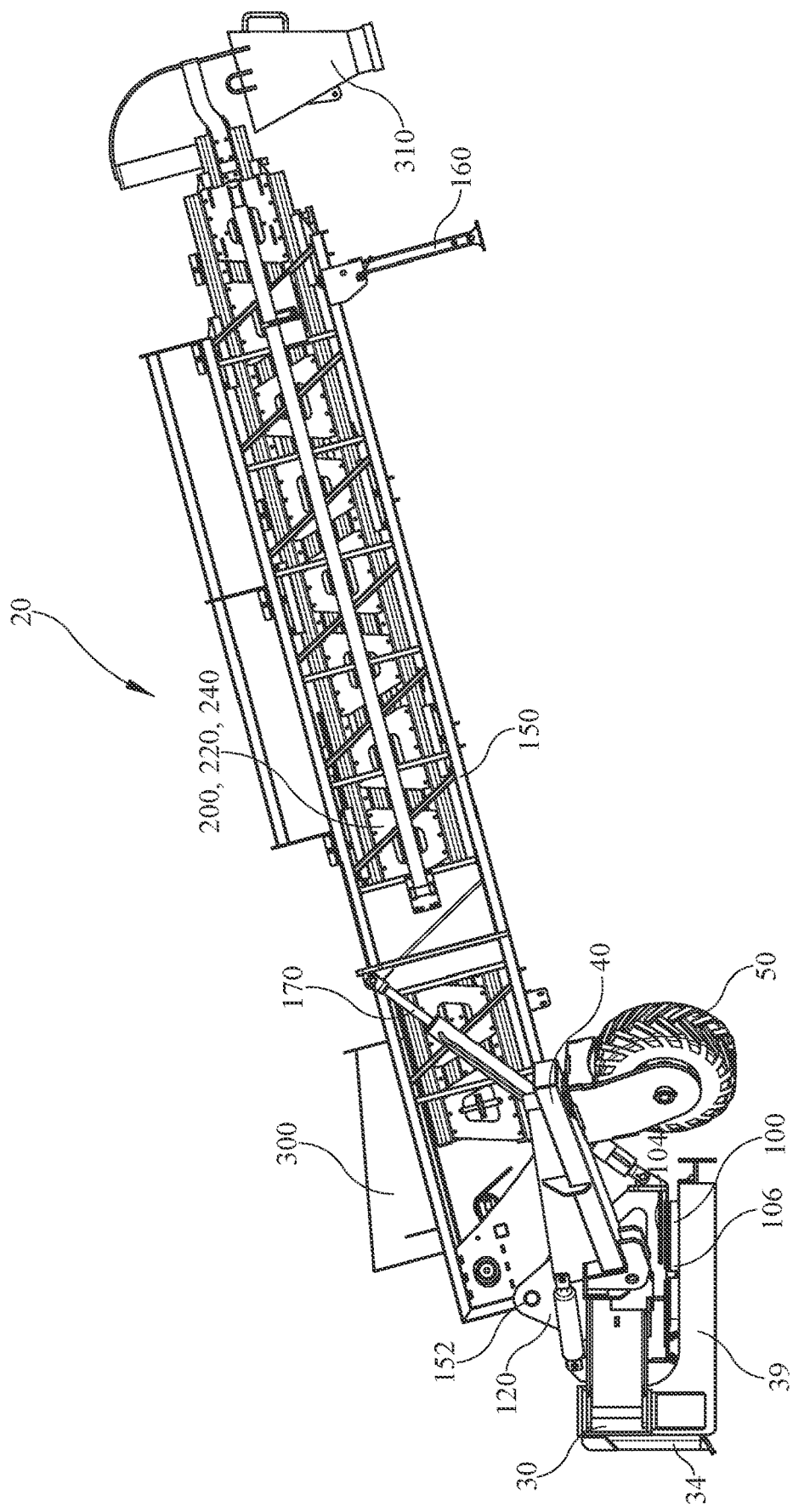
FIG. 9 is a side view of a portable conveyor for use with a skid loader in accordance with some aspects and embodiments.

Referring again to FIGS. 1-8 continuous conveyor belt 280 is routed over a plurality of guide rollers 270 that are disposed at a plurality of points along boom frame 150, and conveyor sections 200, 220, and 240. For the sake of clarity, only a portion of conveyor belt 280 is depicted so that conveyor sections 200, 220 and 240 may be viewed, but it will be understood that conveyor belt 280 is routed around all three conveyor sections 200, 220 and 240. Guide rollers 270 are journaled for rotation to provide support and tension to belt 280 as it moves. Furthermore, a plurality of tensioning rollers 272 are provided at either end of first conveyor section 200. Tension rollers 272 may be adjusted forwardly or rearwardly to add or reduce tension on belt 280 as required for different material loads and operating conditions. As best seen in FIG. 5, belt 280 is driven by a belt drive motor 290, that may either be hydraulic or electric as desired for a given application. Belt drive motor 290 may be mounted proximate a rear end 202 of first conveyor section 200, such that motor 290 drives or rotates a rear roller 270, either directly or through rotation of a gear, belt, or chain and sprocket, thus providing rotation to belt 280. In some aspects of system 20 belt drive motor 290 is controlled by operation of hydraulic or electrical systems integral to skid steer 1.

Referring again to FIGS. 1-3 a hopper 300 is mounted to boom frame 150 above rear end 202 of first conveyor section 200 to facilitate loading of material onto belt 280 for transport. A plurality of different hopper sizes may be employed in conjunction with conveyor system 20 depending upon the material being conveyed, and its volume and density. Material may be placed into hopper 300 by manual addition or operation of a loader or other automated material distribution system whereby hopper 300 direct the material onto first conveyor section 200 belt 280. Additionally, an outlet cone 310 may in some embodiments be secured to a front end 242 of third conveyor section 240, such that outlet cone 310 receives material being conveyed off front end 242 of conveyor section 240 by belt 280 and directs it as desired by an operator or user.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," "secured," and "mounted," and variations thereof herein are used broadly and encompass direct and indirect connections, couplings, and mountings. In addition, the terms "secured" and "mounted" and variations thereof are not restricted to physical or mechanical connections or couplings.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

We claim:

1. A conveyor apparatus for conveying a material, said apparatus capable of attachment to a skid loader, said skid loader having an accessory mounting assembly, a hydraulic system for supplying pressurized hydraulic fluid, and an electrical system for providing a source of electrical power, said conveyor apparatus comprising:
   a mounting frame having a mounting plate disposed on a rear portion hereof for securing said mounting frame to said skid loader mounting assembly, said mounting frame having a rotatable slew drive secured thereto that includes a rotatable upper plate;
   a boom frame having a rear and front end, said rear end thereof secured to said slew drive upper plate, said boom frame housing a plurality of connected conveyor sections, said sections connected by a belt that is rotatably disposed around a plurality of rollers;
   at least one conveyor hydraulic motor operably coupled to said skid loader hydraulic system, said hydraulic motor operatively coupled to at least conveyor drive roller for rotating said conveyor belt; and
   a plurality of replaceable wear slides positioned at a plurality of points along a bottom portion of said boom frame, said first conveyor section, said second conveyor section, and said third conveyor section.

2. The apparatus of claim 1 comprising:
   a first conveyor section for supporting and guiding said conveyor belt driven by said conveyor drive roller disposed inside said boom frame;
   a second conveyor section for supporting and guiding said conveyor belt that is slidably mounted with respect to said first conveyor section; and
   a third conveyor section for supporting and guiding said conveyor belt that is slidably mounted with respect to said first and second conveyor sections, wherein said first and second conveyor sections are capable of being extended outwardly beyond a front end of said boom frame, thereby providing a telescopic and extendable conveyor apparatus.

3. The apparatus of claim 2 comprising:
   at least one tensioning roller over which said conveyor belt is routed, said tensioning roller journaled for rotation proximate a terminal end of said third conveyor section and said tensioning roller capable of at least horizontal adjustment to provide tension to said conveyor belt.

4. The apparatus of claim 2 comprising:
   a plurality of guide rollers journaled for rotation at a plurality of points along said boom frame and said first, second and third conveyor sections to provide support and tension to said conveyor belt.

5. The apparatus of claim 2 comprising:
   a pair of telescopic boom actuators secured between a point of said boom frame and a front end of said second conveyor section, on either side thereof, said boom actuators being capable of extension and retraction, whereby extension of said boom actuators extends said second conveyor section outwardly from said first conveyor section; and
   at least one telescopic boom cable secured at a first end to said second conveyor and at a second end to said third conveyor section, said telescopic boom cable also being routed around a pulley mounted for rotation at a point on said third conveyor section; and
   wherein as telescopic boom actuators extend said second conveyor section, said telescopic boom cables are placed under tension thereby simultaneously extending said third boom section outwardly.

6. The apparatus of claim 2 comprising:
   a pair of boom mounts secured to and extending from said slew drive upper plate, having a pair of opposed hinges to which said boom frame rear end is pivotally secured; and
   a pair of conveyor elevation actuators secured between an upper point on said boom frame and said mounting frame, wherein extension of said elevation actuators elevates the front end of said boom frame, thereby elevating said conveyor.

7. The apparatus of claim 1 comprising:
a pair of outriggers secured for horizontal rotation to opposed sides of said mounting frame, said outriggers having a terminal end having a rotatable wheel secured thereto.

8. The apparatus of claim 7 wherein each of said pair of outriggers comprises:
an outrigger lateral arm having first and second ends, said first end rotatably secured to said mounting frame for lateral rotation;
an outrigger elevation arm having first and second ends, said first end secured for rotation to said second end of said lateral arm;
a wheel pivotally secured to said second end of said elevation arm; and
whereby said outriggers may be positioned to level said conveyor apparatus and positioned for transport of said conveyor apparatus.

9. The apparatus of claim 8 wherein each of said pair of outriggers comprises:
a lateral actuator secured between said mounting frame and said second end of said lateral arm whereby extension and retraction of said lateral actuator effects lateral rotation of said lateral arm; and
an elevation actuator secured between said first end of said lateral arm and said first end of said elevation arm whereby extension and retraction of said elevation actuator effects elevation and lowering of said elevation arm.

10. The apparatus of claim 9 wherein said lateral actuator and said elevation actuator are hydraulic cylinders operatively coupled to said skid loader hydraulic system.

11. The apparatus of claim 9 comprising:
a slew ring hydraulic motor operatively coupled to said skid loader hydraulic system for powering said slew drive and rotating of said boom frame.

12. The apparatus of claim 11 wherein said boom frame and said conveyor sections are rotatable through at least forty-five degrees of rotation.

13. The apparatus of claim 12 wherein said lateral actuator and said elevation actuator are electrically powered actuators operatively coupled to said skid loader electrical power system.

14. The apparatus of claim 2 comprising:
a hopper mounted above the rear end of said boom frame for collecting and guiding said material onto said first conveyor section.

15. The apparatus of claim 2 comprising:
an outlet cone secured at a terminal end of said third conveyor section for collecting and guiding said material out of said conveyor apparatus.

16. A conveyor apparatus for attachment to a skid loader, said skid loader having an accessory mounting assembly, a hydraulic system for supplying pressurized hydraulic fluid, and an electrical system for providing a source of electrical power, said conveyor apparatus comprising:

a mounting frame having a mounting plate disposed on a rear portion hereof for securing said mounting frame to said skid loader mounting assembly, said mounting frame having a rotatable slew drive secured thereto that includes a rotatable upper plate capable of generally horizontal rotation;
a boom frame secured to said slew drive upper plate;
a first conveyor section for supporting and guiding a conveyor belt, said conveyor section having at least one conveyor drive roller, said first conveyor section disposed inside said boom frame;
a second conveyor section for supporting and guiding said conveyor belt that is slidably mounted with respect to said first conveyor section; and
a third conveyor section for supporting and guiding said conveyor belt that is slidably mounted with respect to said first and second conveyor sections, wherein said first and second conveyor sections are capable of being extended outwardly beyond a front end of said boom frame, thereby providing a telescopic and extendable conveyor apparatus;
a pair of telescopic boom actuators secured between a point of said boom frame and a front end of said second conveyor section, on either side thereof, said boom actuators being capable of extension and retraction to elevate said boom frame;
a pair of outriggers secured for horizontal rotation to opposed sides of said mounting frame, said outriggers each having a lateral arm having first and second ends, and an elevation arm having first and second ends, said elevation arm having a a rotatable wheel secured to the second end thereof; and
at least one conveyor hydraulic motor operably coupled to said skid loader hydraulic system, said hydraulic motor operatively coupled to at least conveyor drive roller for rotating said conveyor belt.

17. The apparatus of claim 16 comprising:
a lateral actuator secured between said mounting frame and said second end of said lateral arm whereby extension and retraction of said lateral actuator effects lateral rotation of said lateral arm; and
an elevation actuator secured between said first end of said lateral arm and said first end of said elevation arm whereby extension and retraction of said elevation actuator effects elevation and lowering of said elevation arm.

18. The apparatus of claim 17 wherein said slew drive, said telescopic boom actuators, said lateral actuator and said elevation actuator are hydraulic cylinders operatively coupled to said skid loader hydraulic system.

19. The apparatus of claim 17 wherein said slew drive, said telescopic boom actuators, said lateral actuator and said elevation actuator are electrical actuators operatively coupled to said skid loader electrical system.

20. The apparatus of claim 18 wherein said actuators are operated through a remote control user interface.

* * * * *